(12) United States Patent
Adams et al.

(10) Patent No.: US 7,217,470 B2
(45) Date of Patent: May 15, 2007

(54) CARTRIDGE WITH FUEL SUPPLY AND MEMBRANE ELECTRODE ASSEMBLY STACK

(75) Inventors: Paul Adams, Monroe, CT (US); Andrew J. Curello, Hamden, CT (US); Floyd Fairbanks, Naugatuck, CT (US)

(73) Assignee: Societe BIC, Clichy Cedex (FR)

( * ) Notice: Subject to any disclaimer, the term of this patent is extended or adjusted under 35 U.S.C. 154(b) by 247 days.

(21) Appl. No.: 10/843,638

(22) Filed: May 11, 2004

(65) Prior Publication Data

US 2005/0255359 A1 Nov. 17, 2005

(51) Int. Cl.
*H01M 8/04* (2006.01)
(52) U.S. Cl. .......................... 429/22; 429/34
(58) Field of Classification Search ...................... None
See application file for complete search history.

(56) References Cited

U.S. PATENT DOCUMENTS

| | | | |
|---|---|---|---|
| 4,496,309 A | 1/1985 | Schachter | |
| 4,560,345 A | 12/1985 | Schachter | |
| 5,945,231 A | 8/1999 | Narayanan et al. | |
| 5,976,725 A * | 11/1999 | Gamo et al. | 429/25 |
| 5,992,008 A | 11/1999 | Kindler | |
| 6,254,748 B1 | 7/2001 | Surampud et al. | |
| 6,268,077 B1 * | 7/2001 | Kelley et al. | 429/33 |
| 6,306,285 B1 | 10/2001 | Narayanan et al. | |
| 6,630,518 B1 | 10/2003 | Paronen | |
| 6,887,596 B2 * | 5/2005 | Leban | 429/9 |
| 2002/0127451 A1 | 9/2002 | Cao et al. | |
| 2003/0077493 A1 | 4/2003 | Colborn | |
| 2003/0082416 A1 * | 5/2003 | Bullock et al. | 429/12 |
| 2003/0082426 A1 | 5/2003 | Bullock et al. | |
| 2003/0082427 A1 | 5/2003 | Prasad et al. | |
| 2003/0096150 A1 | 5/2003 | Rice et al. | |
| 2003/0131663 A1 | 7/2003 | Gore et al. | |
| 2003/0134162 A1 | 7/2003 | Gore et al. | |
| 2005/0058873 A1 * | 3/2005 | Arthur et al. | 429/34 |
| 2005/0142403 A1 * | 6/2005 | Ulmer et al. | 429/19 |

* cited by examiner

*Primary Examiner*—John S. Maples
(74) *Attorney, Agent, or Firm*—The H.T. Than Law Group

(57) ABSTRACT

The present invention is directed to a fuel cell system with various features for optimal operations of an electronic device. The fuel cell system includes a fuel cartridge with a fuel reservoir containing fuel and a membrane electrode assembly (MEA) or a stack. The fuel cartridge is selectively operatively associated with the electronic device to power the device. In one embodiment, the fuel cartridge may be received within a chamber in the electronic device. In another embodiment, the fuel cartridge may be operatively associated with the electronic device while external thereto.

17 Claims, 5 Drawing Sheets

CARTRIDGE WITH FUEL SUPPLY AND MEMBRANE ELECTRODE ASSEMBLY STACK

FIELD OF THE INVENTION

This invention generally relates to fuel cell systems, and more particularly to fuel systems using fuel cells and fuel cartridges, and yet more particularly this invention relates to incorporating a membrane electrode assembly into the fuel cartridge.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel and more efficient than portable power storage, such as lithium-ion batteries.

In general, fuel cell technologies include a variety of different fuel cells, such as alkali fuel cells, polymer electrolyte fuel cells, phosphoric acid fuel cells, molten carbonate fuel cells, solid oxide fuel cells and enzyme fuel cells. Some fuel cells utilize compressed hydrogen ($H_2$) as fuel. Compressed hydrogen is generally kept under high pressure, and is therefore difficult to handle. Furthermore, large storage tanks are typically required and cannot be made sufficiently small for consumer electronic devices. Proton exchange membrane (PEM) fuel cells use methanol ($CH_3OH$), sodium borohydride ($NaBH_4$), hydrocarbons (such as butane) or other fuels reformed into hydrogen fuel. Conventional reformat fuel cells require reformers and other vaporization and auxiliary systems to convert fuel to hydrogen to react with oxidant in the fuel cell. Recent advances make reformer or reformat fuel cells promising for consumer electronic devices. Other PEM fuel cells use methanol ($CH_3OH$) fuel directly ("direct methanol fuel cells" or DMFC). DMFC, where methanol is reacted directly with oxidant in the fuel cell, is the simplest and potentially smallest fuel cell, and also has promising power application for consumer electronic devices. Solid oxide fuel cells (SOFC) convert hydrocarbon fuels, such as butane, at high heat to produce electricity. SOFC requires relatively high temperature in the range of 1000° C. for the fuel cell reaction to occur.

The chemical reactions that produce electricity are different for each type of fuel cell. For DMFC, the chemical-electrical reaction at each electrode and the overall reaction for a direct methanol fuel cell are described as follows:

Half-reaction at the anode:

$$CH_3OH+H_2O \rightarrow CO_2+6H^++6e^-$$

Half-reaction at the cathode:

$$1.5O_2+6H^++6e^- \rightarrow 3H_2O$$

The overall fuel cell reaction:

$$CH_3OH+1.5O_2 \rightarrow CO_2+2H_2O$$

Due to the migration of the hydrogen ions ($H^+$) through the PEM from the anode to the cathode and due to the inability of the free electrons ($e^-$) to pass through the PEM, the electrons must flow through an external circuit, thereby producing an electrical current through the external circuit. The external circuit may be used to power many useful consumer electronic devices, such as mobile or cell phones, calculators, personal digital assistants, laptop computers, and power tools, among others.

DMFC is discussed in U.S. Pat. Nos. 5,992,008 and 5,945,231, which are incorporated herein by reference in their entireties. Generally, the PEM is made from a polymer, such as Nafion® available from DuPont, which is a perfluorinated material having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

Another fuel cell reaction for a sodium borohydride reformer fuel cell is as follows:

$$NaBH_4 \text{ (aqueous)} + 2H_2O \rightarrow \text{(heat or catalyst)} \rightarrow 4(H_2) + (NaBO_2)\text{(aqueous)}$$

Half-reaction at the anode:

$$H_2 \rightarrow 2H^+ + 2e^-$$

Half-reaction at the cathode:

$$2(2H^+ + 2e^-) + O_2 \rightarrow 2H_2O$$

Suitable catalysts for this reaction include platinum and ruthenium, and other metals. The hydrogen fuel produced from reforming sodium borohydride is reacted in the fuel cell with an oxidant, such as $O_2$, to create electricity (or a flow of electrons) and water byproduct. Sodium borate ($NaBO_2$) byproduct is also produced by the reforming process. A sodium borohydride fuel cell is discussed in U.S. published patent application No. 2003/0082427, which is incorporated herein by reference.

One of the more important features for fuel cell application is fuel storage. The fuel supply should also be easily inserted into the fuel cell or the electronic device that the fuel cell powers. Additionally, the fuel supply should also be easily replaceable or refillable.

U.S. patent publication No. 2003/0082427 discloses a fuel cartridge where sodium borohydride fuel is reformed within the cartridge to form hydrogen and byproduct. However, the prior art does not disclose a fuel supply that allows in situ production of fuel or that contains reagents amenable to non-corrosive, low cost storage, or fuel supplies with the advantages and features described below.

Typically, the MEA is located inside a fuel cell which is located inside consumer electronic devices. U.S. published patent application Nos. 2003/0082416 and 2003/0082426 disclose such devices. In such devices, the fuel supply is removable and stored in a cartridge. The life of the MEA is usually limited by the life of the PEM. The PEM efficiency is susceptible to various factors such as fuel flow rate, metal ion concentration in the fuel, fuel temperature, and ambient/stack temperature. When the PEM efficiency is at a sufficiently low level, the PEM has to be replaced or refurbished. Frequent servicing of the PEM is undesirable as it requires servicing the electronic device.

A need exists for a fuel cell system that allows servicing or repairing the PEM without servicing the electronic device.

SUMMARY OF THE INVENTION

The present invention is directed to a fuel cell system comprising an electronic device having a housing defining a fuel cartridge chamber and a fuel cartridge removably receivable in the fuel cartridge chamber. The fuel cartridge contains at least one membrane electrode assembly or a stack, and a fuel reservoir containing fuel. The fuel is transported to the membrane electrode assembly for conversion to electricity to power the electronic device. The electronic device may have a controller controlling the functions of the electronic device and the fuel cartridge, and the balance of plant occurs at least partially within the electronic device.

The present invention is also directed to a fuel cell cartridge adapted to be inserted to an electrical device to supply electricity to the electronic device. The fuel cell cartridge has a membrane electrode assembly or a stack, and a fuel reservoir containing fuel. The fuel is reacted at the membrane electrode assembly to produce the electricity.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE PREFERRED EMBODIMENTS

Figure 1:
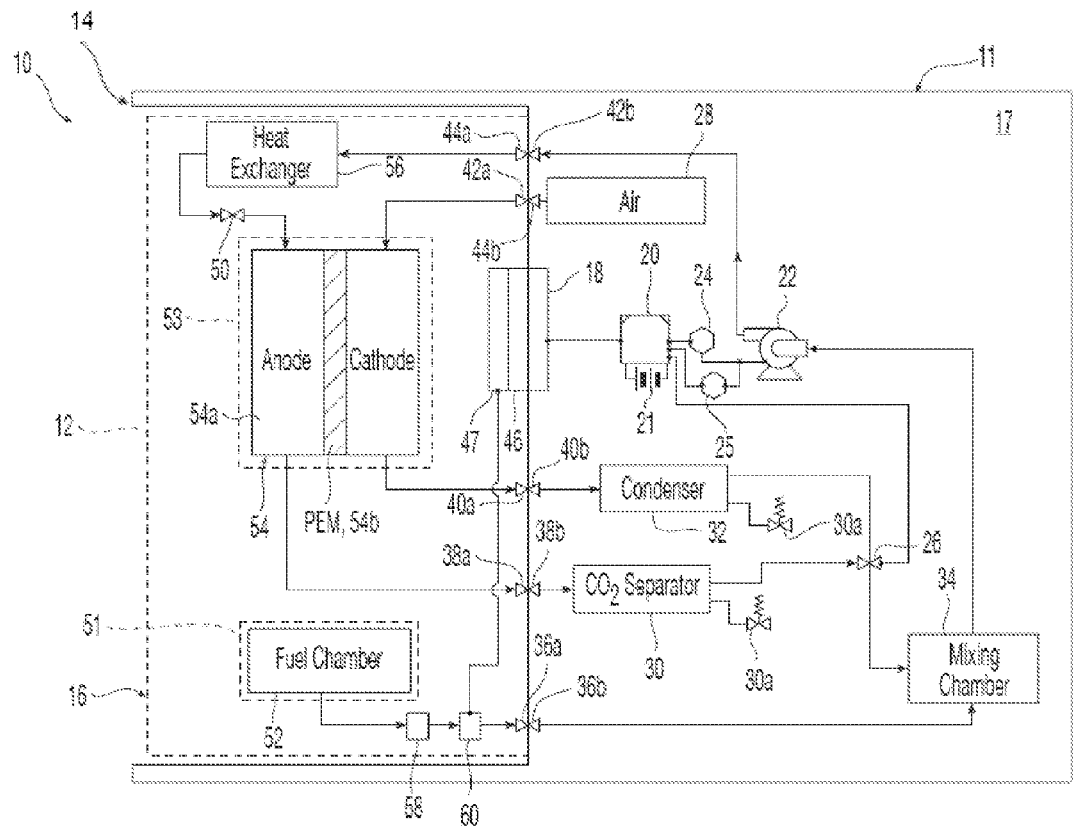
FIG. 1 is a schematic view of a fuel cell system of the present invention including a fuel cartridge with a fuel reservoir and a MEA or a stack, wherein the fuel cartridge is operatively connected to the electronic device.

As illustrated in the accompanying drawings and discussed in detail below, the present invention is directed to a fuel cell system, which uses fuel cell fuels such as methanol and water, methanol/water mixture, methanol/water mixtures of varying concentrations or pure methanol. Methanol is usable in many types of fuel cells, e.g., DMFC, enzyme fuel cell, reformat fuel cell, among others. The fuel cell system may contain other types of fuel cell fuels, such as ethanol or alcohols, chemicals that can be reformatted into hydrogen, or other chemicals that may improve the performance or efficiency of fuel cells. Fuels also include potassium hydroxide (KOH) electrolyte, which is usable with metal fuel cells or alkali fuel cells, and can be stored in fuel supplies. For metal fuel cells, fuel is in the form of fluid borne zinc particles immersed in a KOH electrolytic reaction solution, and the anodes within the cell cavities are particulate anodes formed of the zinc particles. KOH electrolytic solution is disclosed in U.S. published patent application No. 2003/0077493, entitled "Method of Using Fuel Cell System Configured to Provide Power to One or more Loads," published on Apr. 24, 2003, which is incorporated herein by reference in its entirety. Fuels also include a mixture of methanol, hydrogen peroxide and sulfuric acid, which flows past a catalyst formed on silicon chips to create a fuel cell reaction. Fuels also include aqueous sodium borohydride ($NaBH_4$) and water discussed above. Fuels further include hydrocarbon fuels, which include, but are not limited to, butane, kerosene, alcohol and natural gas, disclosed in U.S. published patent application No. 2003/0096150, entitled "Liquid Hereto-Interface Fuel Cell Device," published on May 22, 2003, which is incorporated herein by reference in its entirety. Butane is a suitable fuel for solid oxide fuel cells. Fuels also include liquid oxidants that react with fuels. The present invention is, therefore, not limited to any type of fuels, electrolytic solutions, oxidant solutions or liquids or solids contained in the supply or otherwise used by the fuel cell system. The term "fuel" as used herein includes all fuels that can be reacted in fuel cells or in the fuel supply, and includes, but is not limited to, all of the above suitable fuels, electrolytic solutions, oxidant solutions, liquids, solids and/or chemicals and mixtures thereof.

As used herein, the term "fuel supply" includes, but is not limited to, disposable cartridges, refillable/reusable cartridges, containers, cartridges that reside inside the electronic device, removable cartridges, cartridges that are outside of the electronic device, fuel tanks, fuel reservoirs, fuel refilling tanks, other containers that store fuel and the tubings connected to the fuel tanks and containers. While a cartridge is described below in conjunction with the exemplary embodiments of the present invention, it is noted that these embodiments are also applicable to other fuel supplies and the present invention is not limited to any particular type of fuel supplies.

Figure 2:
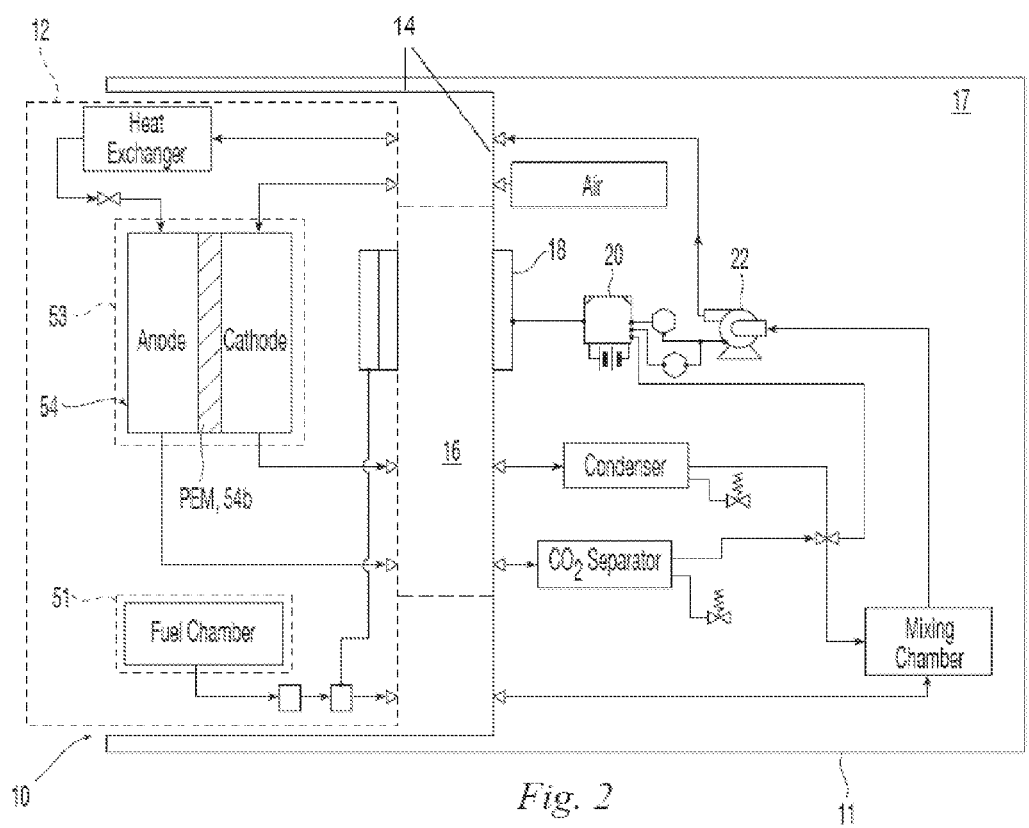
FIG. 2 is an exploded schematic view of the fuel cell system of FIG. 1, wherein the fuel cartridge is removed from the electronic device

As illustrated in the accompanying drawings and discussed in detail below, the present invention is directed to fuel cell system 10 for powering a load 11, as shown in FIG. 1. Load 11 is typically an electronic device that fuel cell cartridge 12 powers. In the first embodiment of fuel cell system 10, load or electronic device 11 is the external circuitry and associated functions of any useful consumer electronic devices. In this embodiment, electronic device 11 includes housing 14 that defines fuel cartridge chamber 16 (shown in FIG. 2) for removably receiving fuel cell cartridge 12. In FIG. 1, cartridge 12 is received in chamber 16 and cartridge 12 is operatively connected to electronic device 11. When fuel cartridge 12 is empty of fuel, a user can separate the cartridge from the electronic device and insert another cartridge or refill the empty cartridge, as shown in FIG. 2.

Electronic device 11 may include, mobile or cell phones, calculators, power tools, gardening tools, personal digital assistants, digital cameras, laptop computers, computer games systems, portable music systems (MP3 or CD players), global positioning systems, and camping equipment, among others.

FIG. 1 contains two sets of connecting lines. The first set of connecting lines comprises fluid, i.e., liquid and gas, lines, which have arrows to show the direction of flow. The second set of connecting lines comprises electrical lines, which have darkened circles at the intersections to show electrical connectivity. While this embodiment is described herein with respect to direct methanol fuel cell, it is understood that this embodiment is suitable for any fuel cell.

Electronic device 11 preferably includes the following electronically controlled components: first electrical contact 18, chamber 16 adapted to receive fuel cell cartridge 12, controller 20, optional battery 21, pump 22, flow meter 24, fuel concentration sensor 25, and water metering valve 26. Controller 20 is in electrical communication with these devices. In addition, electronic device 11 includes the following fluidic components: air chamber 28, carbon dioxide separator 30, condenser 32, and mixing chamber 34. These fluidic components are in fluid communication with one another or with other fluidic components, as discussed below. Furthermore, the electronic device includes a plurality of valve components 36b, 38b, 40b, 42b, 44b for cell connecting various fluidic components on electrical device 11 to various fluidic components on fuel cell cartridge 12 as discussed in detail below.

Fuel cell cartridge 12 preferably includes the following electronically controlled components: second electrical contact 46, information storage device 47, and regulator valve 50. Contact 46 is in electrical communication with the information storage device 47 and regulator valve 50, and connects to first electrical contact 18. In addition, fuel cell cartridge 12 includes housing 51 (shown in phantom) containing fuel reservoir 52, membrane electrode assembly (MEA) 54, and heat exchanger 56. MEA or element 54 also refers to a stack. As used herein, a stack includes at least one membrane electrode assembly and bipolar plates. The stack also includes optional fuel and oxygen supplies and currently collection components. Heat exchanger 56 can also be positioned in electronic device 11. MEA 54 preferably includes anode 54a, proton exchange membrane (PEM) 54b or other electrolyte layer, and cathode 54c. Optionally, fuel cell cartridge 12 may further include ion filter 58 and ion sensor 60. These components are in fluid communication with one another or with other fluidic components, as discussed below. Furthermore, the fuel cartridge 12 includes a plurality of valve components 36a, 38a, 40a, 42a, and 44a operatively associated with valve components 36b, 38b, 40b, 42b, 44b for fluidly connecting various components of the fuel cartridge 12 with various components of the electrical device 11, as discussed in detail below.

Referring to FIG. 1, when cartridge 12 is loaded or inserted into chamber 16, first and second electrical contacts 18 and 46 connect so that controller 20 is electronically linked to the information storage device 47 and the remaining electrical components of cartridge 12. As a result, controller 20 can receive information from fuel cell cartridge 12 and control the functions of regulator valve 50 and can read and write to information storage device 47. Preferred controller and information storage devices and their operations are disclosed in commonly owned, co-pending U.S. patent application Ser. No. 10/725,237, entitled "Fuel Cell Supply Including Information Storage Device and a Controlling System," filed on Dec. 1, 2003. The '237 application is incorporated herein by reference in its entirety.

Suitable information storage devices include, but are not limited to, random access memory (RAM), read-only memory (ROM), programmable read-only memory (PROM), erasable programmable read-only memory (EPROM), electrically erasable programmable read-only memory (EEPROM), flash memory, electronically readable elements (such as resistors, capacitance, inductors, diodes and transistors), optically readable elements (such as bar codes), magnetically readable elements (such as magnetic strips), integrated circuits (IC chips) and programmable logic arrays (PLA) and smart chip (such as those used in batteries), among others. The preferred information storage device includes PLA and EEPROM, and the present invention is described herein with the EEPROM. However, it is understood that the present invention is not limited to any particular type of information storage device.

Typically, information is stored as zeros (0) and ones (1) in the binary system. Groups of these binary digits form octal digits (groups of 3 binary digits) or hexadecimal digits (groups of 4 binary digits). Hexadecimal digits are commonly used for ease of reading information storage device.

EEPROM is a user-modifiable read-only memory that can be erased and rewritten or reprogrammed repeatedly throughout its useful life through the application of higher than normal electrical writing voltage on the same pin among other programming means. EEPROM does not need to be removed from the fuel supply to be modified. Advantageously, portions of an EEPROM can be write-protected, i.e., information originally written is saved and protected from the writing voltage, while other portions of the EEPROM can be repeatedly rewritten. Additionally, an EEPROM, similar to other ROMs, does not need electrical power to maintain the memory or data stored thereon. Hence, when an electrical device powers up, it relies on the information stored on an EEPROM to start-up and run its programming. To erase and rewrite an EEPROM, a controller directs a predetermined voltage at a particular location of the EEPROM to store new information thereon.

EEPROM, as well as the other ROMs, are widely available commercially. Suitable EEPROMs are available from Cypress Semiconductor Corp. of San Jose, Calif., and Altera Corp. of San Jose, Calif., ATMEL Corporation of Hayward, Calif. and Microchip Technology Inc. of Chandler, Ariz., among others.

In an alternative embodiment, the electrical connection between the first and second contacts 18 and 46 can be wireless. Suitable wireless transmission systems include Blue Tooth technology, radio frequency, infrared rays, etc.

In addition to reading and writing to information storage device 47, controller 20 also controls the functions of electronic device 11, and the valves, sensors and pumps in electronic device 11 and cartridge 12. Preferably, housing 17 also supports at least one optional battery 21 for powering various components of fuel cell system 10 and electronic device 11 when the MEA is not operating or during system start-up. Alternatively, optional battery 21 powers controller 20 when cartridge 12 is empty or when the fuel cell/MEA is off. Optional battery 21 can be replaced by or used in conjunction with solar panels.

Suitable pumps 22 are fully disclosed in commonly-owned, co-pending U.S. patent application Ser. Nos. 10/356,793, 10/629,004, 10/629,006. The '793 application entitled "Fuel Cartridge for Fuel Cells" was filed on Jan. 31, 2003. The '004 application entitled "Fuel Cartridge with Flexible Liner" filed on Jul. 29, 2003. The '006 application entitled "Fuel Cartridge with Connecting Valve" was filed on Jul. 29, 2003. These patent applications are incorporated herein by reference in their entirety.

A suitable pump is a piezo-electric pump. Suitable piezoelectric pumps include those available from PAR Technologies, LLC of Newport News, Va. Piezoelectric pumps have no moving parts and are lightweight, compact, rugged, quiet and efficient. These pumps have excitation voltages of greater than about 50 V and current draw, for example from as low as about 15 milliamps up to about 130 milliamps at an input voltage from about 2.2 VDC up to about 12 VDC. The flow rate for piezoelectric pumps is from about 10 ml/hour up to about 900 ml/hour at pressures in the range of about 0 to about 5 psi. The size of the pump is from about 0.5 inch$^2$ up to about 1.5 inch$^2$ by less than about 0.5 inches thick. The piezoelectric pump can be constructed from materials that are compatible with the fuels to be used with fuel cells and fuel cartridges. These pumps also operate in a wide range and have long cycle life.

In the present embodiment, pump 22 is external to cartridge 12 and is secured within housing 17. As a result, when cartridge 12 is removed from housing 17, as shown in FIG. 2, pump 22 remains within housing 17. Pump 22 is located upstream of mixing chamber 34 in the present embodiment. In an alternative embodiment, pump 22 can be located downstream of mixing chamber 34 (i.e., between mixing chamber 34 and valve component 36b) or at other locations. Also alternatively, pump 22 can be omitted and cartridge 12 can be pressurized to drive the fuel from cartridge 12 through a control valve to the electronic device 11.

With further reference to FIG. 1, fuel cartridge 12 includes housing 51 with chamber 51a for receiving fuel reservoir 52. In this embodiment, fuel reservoir 52 may include an outer shell or outer casing 52a separate from housing 51. The outer casing may be relatively rigid or flexible. Fuel reservoir 52 can be formed with or without an inner fuel liner or bladder. Cartridges without liners and related components are disclosed in the '793 application. Cartridges with inner liners or bladders are disclosed in the '004 application.

Valve component 36a is attached to cartridge 12 and valve component 36b is attached to electronic device 11. Valve 36a,b is preferably is a two-component valve. Each valve component is capable of forming a seal when fuel cartridge 12 is separated from electronic device 11. Two component valves are fully disclosed in the '006 application. When cartridge 12 is within chamber 16, the fuel within reservoir 52 is in fluid communication with mixing chamber 34 via valve components 36a,b.

In accordance with another aspect of the present invention, ion filter 58 and ion sensor 60 are optionally provided to cartridge 12. Ion filter and ion sensor are fully disclosed in commonly-owned, co-pending patent application Ser. No. 10/725,235 entitled "Fuel Cell System Including an Ion Filter," filed on Dec. 1, 2003. The ion filter removes ions from the fuel and extends the life of the PEM. Ion filter 58 can be positioned within or external to fuel reservoir 52. Ion particles can be removed by ion scavenger agents, chelating agents or ion exchange membrane (e.g., PEM materials).

Ion sensor 60 can ascertain the effectiveness of the filter and to determine when the filter should be replaced. Ion sensor 60 is preferably located within fuel cell cartridge 12, as shown, or be disposed in electronic device 11. Controller 20 can read the ion level in the fuel using ion sensor 60 and write this information to information storage device 47, so that fuel with unacceptable level of ions will not be utilized. Ion sensor 60 can ascertain the ion level by reading the electrical conductivity of the fuel. Higher conductivity indicates higher ion level. The controller can check the ion level in the fuel whenever the electronic device is turned on or when a different cartridge is installed.

MEA 54 is typically positioned between two bipolar plates (not shown). In the present invention, MEA 54 is preferably received by chamber 53 within cartridge 12. Hence, MEA is preferably made from a cost effective material and can be disposed when cartridge 12 is empty. An advantage of one embodiment of the present invention is that when the MEA is disposable, ion filters and/or ion sensors can be omitted. Additionally, internal chamber 51 or fuel reservoir 52 can be refilled and/or replaced, and fuel cell cartridge 12 can be reused until the MEA has to be replaced. Alternatively, MEA or stack 54 can be replaced while the rest of the cartridge is reusable. This provides fuel cell designers with the option using either disposable or reusable PEM inside fuel cell cartridge 12.

Preferably, anode 54a and cathode 54c are formed of conventional materials. PEM 54b of the MEA is preferably formed of an ion-conductive polymer. Suitable ion-conductive polymers include, but are not limited to a perfluorinated sulfonic acid polymer coated with a catalyst, which is available as Nafion® from DuPont, described above. Catalyst coated polymers are known catalyst "supported" polymers. Suitable catalysts include platinum and ruthenium, or alloys thereof, among other metals. Another suitable ion-conductive polymer is polybenzimidazole (PBI) manufactured by Celanese Fuel Cells-USA, Inc. of Murray Hill, N.J. PBI is a high temperature PEM that can operate in the range of 120° to 200° C.

Other suitable ion-conductive polymers are described in Davis, T. A., Genders, J. D. and Pletcher, D., "First Course in Ion Permeable Membranes," at pp. 35–57, and U.S. Pat. No. 6,630,518 B1, which are incorporated herein by reference in their entireties. These polymers include unsubstituted alkene copolymerized with a functionalized alkene containing ionizable groups or their precursors (e.g., Nafion® perfluorinated membranes), and polymerized alkene and ion groups that are introduced into the membrane afterward. Other suitable ion-conductive polymers include GoreTex weatherproof material, which is a polytetrafluoroethylene (PTFE), with a perfluorinated polymer filling the pores, and a polyvinyl fluoride (PVC) film irradiated in a 2.5% chlorosulfonic acid solution. The '518 patent discloses other suitable ion-conductive polymers, including a low permeability membrane being irradiated and then sulfonated. Suitable membrane include polyethylene (PE), polypropylene (PP), polyhexafluoropropylene, polychlorotrifluoroethylene, polytetrafluoroethylene (PTFE), polyvinyl fluoride (PVF), polyvinylidene fluoride (PVDF), copolymers thereof and blends thereof. These membranes and membranes with high permeability are usable with the present invention. Other suitable membranes also include those manufactured by Polyfuel, Inc. Any ion-exchange materials can be used, and inexpensive material, such as those discussed in this paragraph, can be used because the MEA can be replaced when the cartridge is empty or when the efficiency of the MEA has decreased significantly.

As a result of the reactions at the anode 54a, gas byproduct including carbon dioxide is formed on the anode side of a DMFC reaction. These gas byproducts and unreacted fuel, if any, are transported to the carbon dioxide separator 30 in electronic device 11 via valve components 38a,b. Valve 38a,b can be a two-component valve similar to valve 36a,b. Carbon dioxide separator 30 separates the carbon dioxide from unused fuel using the gas' natural boyancy. Additionally, carbon dioxide separator 30 has relief valve 30a to vent the carbon dioxide outside the electronic device 11 to atmosphere. Relief valves can be poppet-type valve disclosed in the '004 application.

These liquid/water byproduct from the cathode is transported to the condenser 32 in the electronic device 11 via valve components 40a,b. Valve 40a,b can be a two-component valve similar to valve 36a,b. Condenser 32 receives the water byproduct, condenses water vapor, if any, and transports the water in liquid form to mixing chamber 34. Additionally, condenser 32 may include relief valve 32a to vent any gas outside electronic device 11 to atmosphere. Alternatively, relief valves 30a and/or 32a may be replaced with a single relief valve on mixing chamber 34.

Valve 26 regulates the flow of water and unreacted fuel to mixing chamber 34 and assists in obtaining optimal fuel concentration in a fuel/water mixture. Controller 20 controls valve 26 to obtain the proper fuel/water concentration in chamber 34.

A fuel/water mixture of the proper concentration is transported from chamber 34 by pump 22. Fuel concentration in the fuel/water mixture is measured by fuel concentration sensor 25 and monitored and regulated by controller 20 using the water metering valve 26. Such sensors are disclosed in U.S. patent publication Nos. 2003/0131663 and 2003/0134162 and in U.S. Pat. Nos. 6,254,748 and 6,306,285. These references are incorporated by reference herein.

The fuel/water mixture flows from pump 22 to heat exchanger 56 in the fuel cartridge 12 via valve components 44a,b. Valve 44a,b can be a two-component valve similar to valve 36a,b. Since the MEA and more particularly the PEM can be sensitive to fuel temperature, heat exchanger 56 cools the fuel to a preferred temperature range. The heat exchanger can be a conventional exchanger and includes fins.

From heat exchanger 56, the fuel/water mixture flows to anode 54a of MEA 54 to react to generate electricity to power electrical device 11. In this embodiment, regulating valve 50 regulates the flow of fuel to MEA 54. Regulating valve 50 may have a variable orifice that can be opened at a predetermined diameter to regulate flow. Alternative regulating valves are disclosed in the '237 application. Similar regulating valves are disclosed in U.S. Pat. Nos. 4,496,309 and 4,560,345. These two patents are incorporated by reference herein in their entireties.

Electronic device 11 further includes air chamber 28 containing air. The air flows from air chamber 28 to cathode 54c in fuel cartridge 12 via valve components 42a,b. Valve 42a,b can be a two-component valve similar to valve 36a,b. Alternatively, air can be supplied from the ambient surrounding directly to the cathode or through the electronic device before receiving the cathode. A pump or fan can also be used to transport air.

As shown in FIGS. 1 and 2, while the MEA is located in cartridge 12, so that it can be more easily replaced, the "balance of plant" is performed substantially in electronic device. The advantage of this is that balance of plant may include sensitive or expensive items, e.g., controller(s), pump(s), that are more suited to be in the electronic device. Depending on cost and reliability these items can also be placed in the cartridge.

Figure 3:
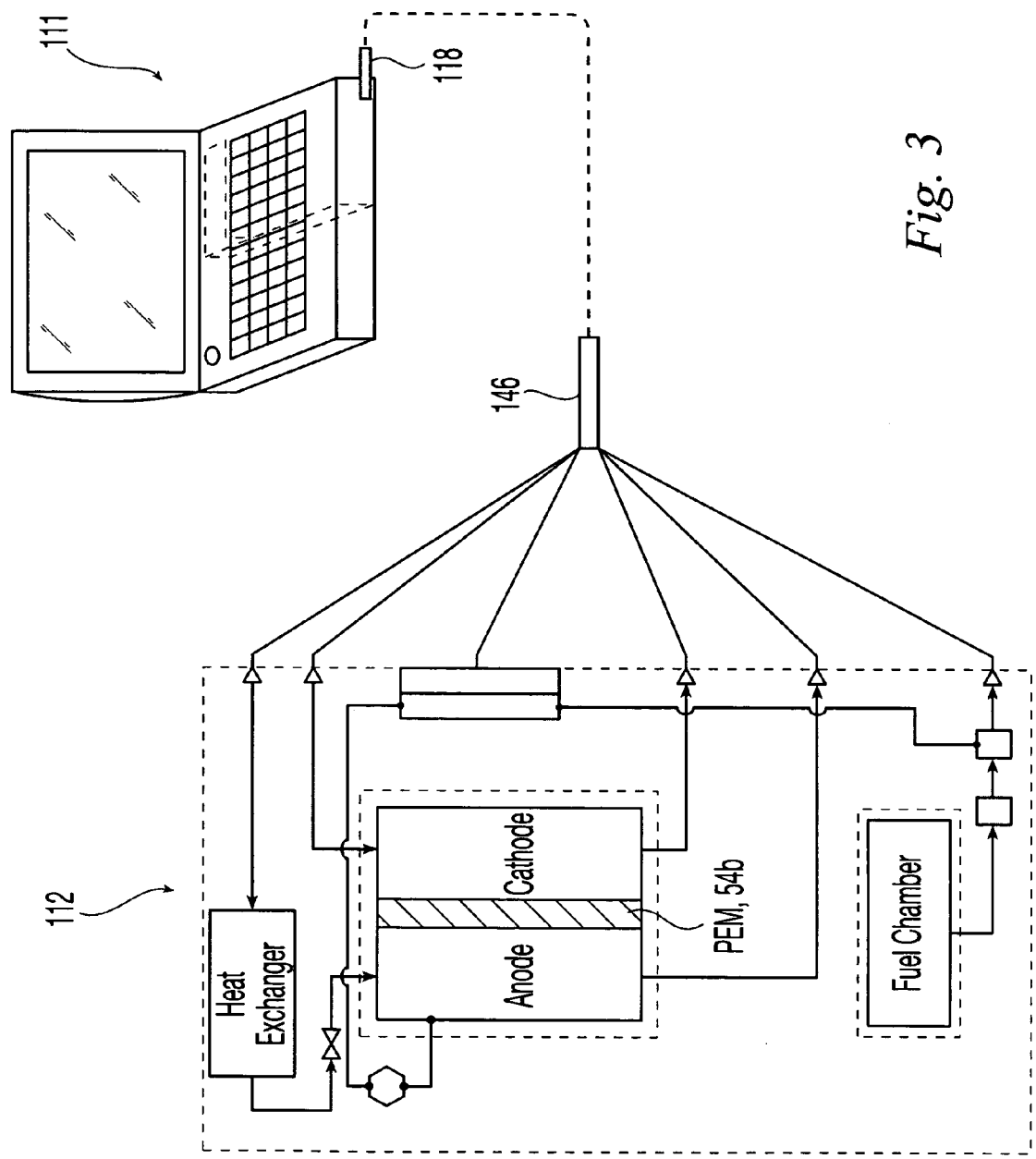
FIG. 3 is a schematic view of an alternative fuel cell system of the present invention wherein the fuel cartridge is used externally to the electronic device.

Referring to FIG. 3, in accordance with another aspect of the present invention, fuel cartridge 112 is provided and is adapted to operate with electronic device 111 while being located externally to the device. Electronic device 111 includes the various electronic and fluidic components of device 11 including first contact 118. In the present embodiment, first contact includes components for electrically and fluidically connecting components of device 111 to fuel cartridge 112. Fuel cartridge 112 includes the various electronic and fluidic components of cartridge 12 including second contact 146. In the present embodiment, second contact includes components for electrically and fluidically connecting components of device 111 to fuel cartridge 112 when contacts 118 and 146 are operatively associated. In an alternative embodiment, fuel cartridge 112 can be incorporated into a docking station that has the second contact and an optional platform for supporting the laptop 111 during use.

Figure 4:
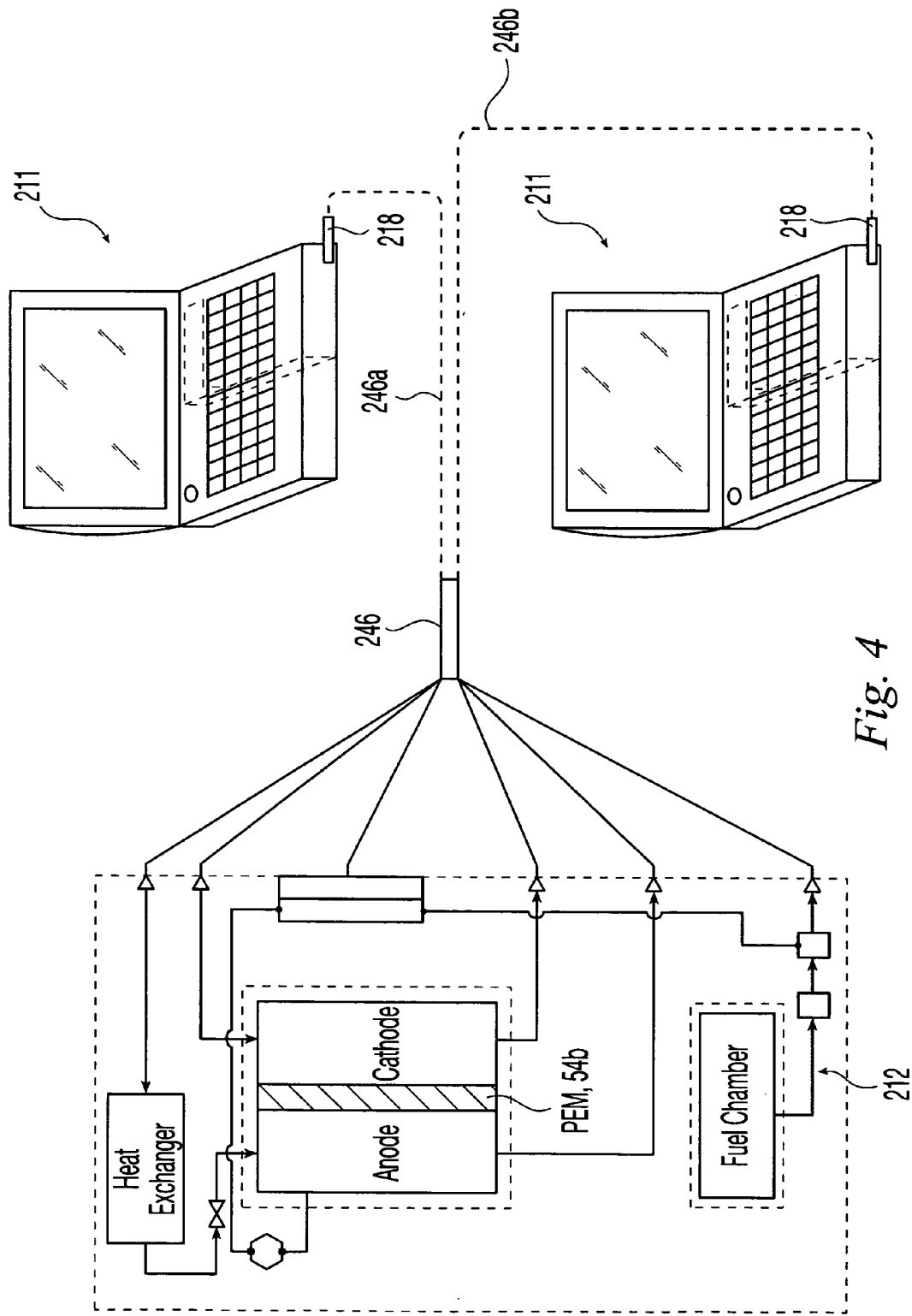
FIG. 4 is a schematic view of yet another alternative fuel cell system of the present invention wherein the fuel cartridge is used externally to two electronic devices.

Referring to FIG. 4, in accordance to another aspect of the present invention, fuel cartridge 212 is provided as a central fueling station or hub or manifold and is adapted to operate with two or more electronic devices 211 while external to the device. Fuel cartridge 212 can be designed to operatively associate with any number of electronic devices 211. Each electronic device 211 includes the various electronic and fluidic components of device 11 including first contact 218. In the present embodiment, first contact includes components for electrically and fluidically connecting components of device 211 to fuel cartridge 212. Fuel cartridge 212 includes the various electronic and fluidic components of cartridge 12 including second contact 246 and lines 246a,b.

In the present embodiment, second contact 246 includes components for electrically and fluidically connecting components of devices 211 to fuel cartridge 212 when contacts 218 and 246 are operatively associated.

In accordance to another aspect of the present invention, some components that are positioned inside electronic device 11, shown in FIG. 1, can be moved into or onto cartridge 12. For example, pump 22 and mixing chamber 34 can be moved to cartridge 12. Additionally, one or more of the air chamber 28, condenser 32 and $CO_2$ separator 30 components can also be moved to cartridge 12.

Alternatively, MEA 54 can be moved to electrical device 11, and fuel reservoir 52, pump 22 and mixing chamber 34 are located in cartridge 12. Mixture of fuel and water can be prepared in the cartridge before being transported to electronic device 11 for reaction in the MEA.

Figure 5:
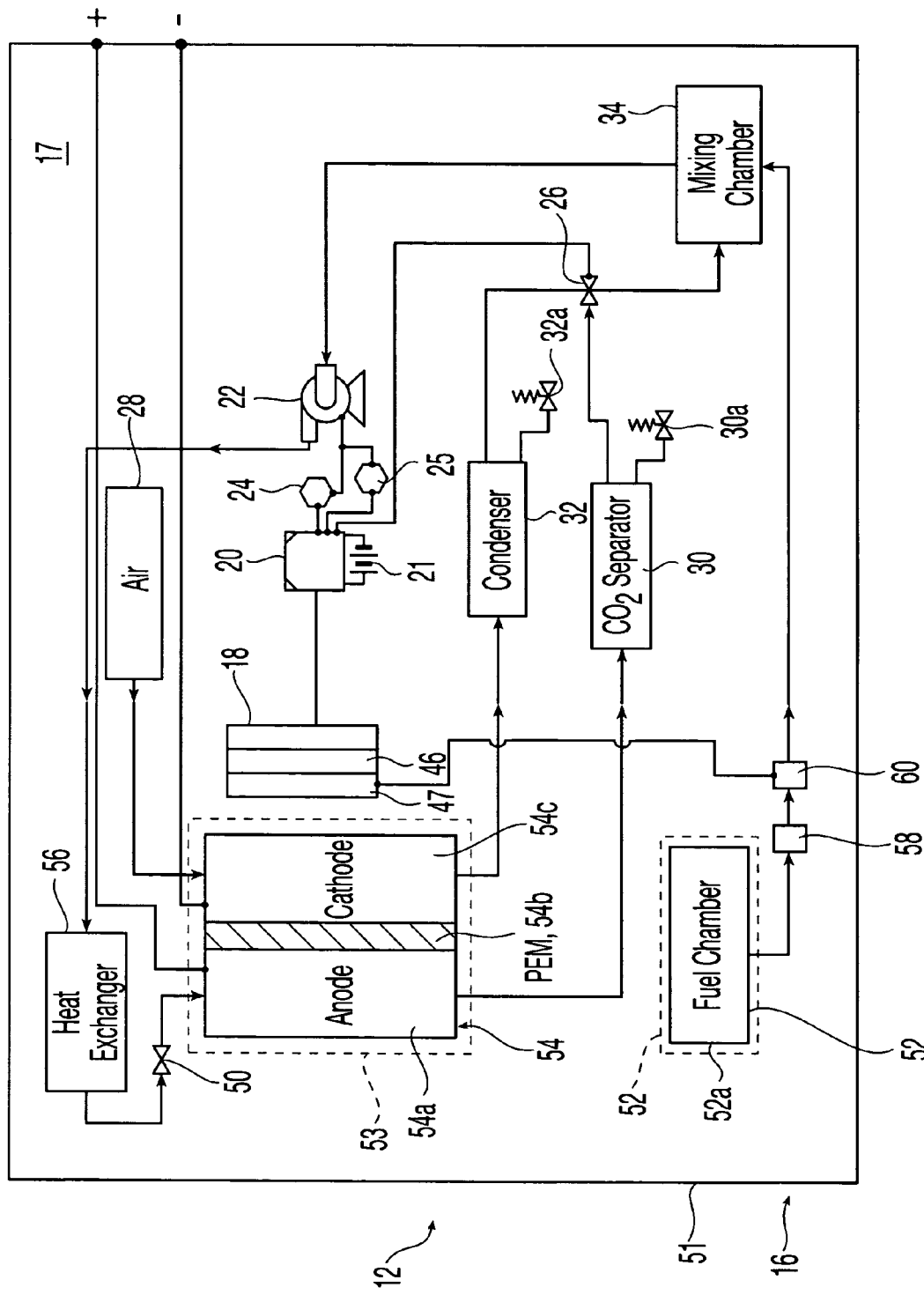
FIG. 5 is a schematic view of a fuel cell cartridge of the present invention.

In accordance to another aspect of the present invention, all the fuel cell components that are shown as positioned in FIG. 1 are moved to cartridge 12. Referring to FIG. 5, cartridge 12 is a stand-alone fuel cell with a replaceable/refillable fuel supply 52 and a repairable/replaceable MEA or stack. The output of this cartridge 12 is the electricity produced from MEA 54. Advantages of such a system include that (i) the MEA can be sized and configured to produce the electricity necessary to operate electronic device 11, whatever it may be and (ii) the valve connections 36a,b, 38a,b, 40a,b, 42a,b, 44a,b and electric connections 18, 46 can be minimized or eliminated.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with feature(s) and/or element(s) from other embodiment(s). Therefore, it will be understood that the appended claims are intended to cover all such modifications and embodiments, which would come within the spirit and scope of the present invention.

We claim:

1. A fuel cell system comprising:
   an electronic device with a housing defining a fuel cartridge chamber;
   a fuel cartridge removably receivable in the fuel cartridge chamber, the fuel cartridge including at least one membrane electrode assembly and a fuel reservoir containing fuel, the fuel is transported to one or more components within the electronic device before being transported to the membrane electrode assembly for conversion to electricity for use by the electronic device.

2. The fuel cell system of claim 1, wherein the electronic device further includes a first electrical contact and a controller, and the fuel cartridge further includes a second electrical contact, when the fuel cartridge is operatively associated with the electronic device the first and second electrical contacts are in electrical communication so that the controller controls the functions of the electronic device and the fuel cartridge.

3. The fuel cell system of claim 1, wherein the membrane electrode assembly includes an anode, a proton exchange membrane, and a cathode.

4. The fuel cell system of claim 2, wherein the fuel cartridge further includes an information storage device in electrical communication with the second electrical contact, when the fuel cartridge is operatively associated with the electronic device the information storage device is readable by a controller.

5. The fuel cell system of claim 1, wherein the fuel cartridge further includes a heat exchanger in fluid communication upstream of the membrane electrode assembly such that the fuel is transportable to the heat exchanger for cooling then to the membrane electrode assembly.

6. The fuel cell system of claim 1, wherein the fuel cartridge further includes an ion filter in fluid communication downstream of the fuel reservoir.

7. The fuel cell system of claim 2, wherein fuel cartridge further includes an ion sensor and the ion sensor is electrically connected with the second electrical contact.

8. The fuel cell system of claim 2, wherein the electronic device further includes a pump for assisting in transporting the fuel to the membrane electrode assembly, when the fuel cartridge is operatively associated with the electronic device.

9. The fuel cell system of claim 8, wherein the pump is in electrical communication with the second electrical contact and the controller.

10. The fuel cell system of claim 1, wherein the electronic device further includes an air chamber, when the fuel cartridge is operatively associated with the electronic device the air chamber is in fluid communication with a cathode of the membrane electrode assembly such that air is transportable to the cathode.

11. The fuel cell system of claim 1, wherein the electronic device further includes a gas byproduct separator, when the fuel cartridge is operatively associated with the electronic device the carbon dioxide separator is in fluid communication with anode of the membrane electrode assembly such that a gas byproduct is transportable to the gas product separator.

12. The fuel cell system of claim 1, wherein the electronic device further includes a condenser, when the fuel cartridge is operatively associated with the electronic device the condenser is in fluid communication with a cathode of the membrane electrode assembly such that a liquid byproduct is transportable to the condenser.

13. The fuel cell system of claim 12, wherein the electronic device further includes a mixing chamber, when the fuel cartridge is operatively associated with the electronic device the mixing chamber is in fluid communication with the condenser and the fuel reservoir such that the fuel is transportable to the mixing chamber and the byproduct is transportable to the mixing chamber and the fuel and the byproduct are mixed then transported to the membrane electron assembly.

14. The fuel cell system of claim 13, wherein the electronic device further includes a metering valve disposed between and in fluid communication with the condenser and the mixing chamber such that the byproduct is transportable to the mixing chamber through the metering valve.

15. The fuel system of claim 1, wherein the membrane electrode assembly is disposable.

16. The fuel system of claim 1, wherein the fuel reservoir is disposable.

17. The fuel system of claim 1, wherein the membrane electrode assembly is arranged in a stack.

* * * * *